United States Patent [19]

Remus

[11] Patent Number: 4,550,630
[45] Date of Patent: Nov. 5, 1985

[54] HERMETICALLY SEALED DRIVE

[75] Inventor: Casimer F. Remus, Tunkhannock, Pa.

[73] Assignee: Allied Corporation, Morris Township, Morris County, N.J.

[21] Appl. No.: 410,226

[22] Filed: Aug. 23, 1982

[51] Int. Cl.[4] .................. F16H 1/28; F16H 23/00; F16J 15/50
[52] U.S. Cl. .................. 74/800; 74/18.1; 74/60
[58] Field of Search .......... 74/800, 18.1, 60, 18, 74/17.8, 63, 640, 412 R

[56] References Cited

U.S. PATENT DOCUMENTS

| 1,896,462 | 2/1933 | Nietsche | 74/800 |
|---|---|---|---|
| 3,029,648 | 4/1962 | Roeser | 74/18.1 |
| 3,051,008 | 8/1962 | Hamren | 74/18.1 |
| 3,139,772 | 7/1964 | Maroth | 74/800 |
| 3,252,341 | 5/1966 | Reiter | 74/18.1 |
| 3,293,926 | 12/1966 | Woellmer | 74/18 |
| 3,306,134 | 2/1967 | Winiarski | 74/18.1 X |
| 3,364,754 | 1/1968 | Langer | 74/18.1 |
| 3,385,135 | 5/1968 | Strandberg | 74/800 |
| 3,933,052 | 1/1976 | Coles | 74/18.1 |
| 4,281,566 | 8/1981 | Brusasco | 74/800 |

FOREIGN PATENT DOCUMENTS

| 0027103 | 8/1980 | European Pat. Off. |
| 1131054 | 4/1959 | Fed. Rep. of Germany . |
| 2106459 | 8/1972 | Fed. Rep. of Germany . |
| 2909410 | 9/1979 | Fed. Rep. of Germany . |
| 347676 | 1/1930 | United Kingdom . |
| 926760 | 10/1960 | United Kingdom . |
| 1462850 | 12/1973 | United Kingdom . |
| 1117587 | 3/1977 | United Kingdom . |
| 2011016 | 12/1978 | United Kingdom . |

OTHER PUBLICATIONS

Soviet Inventions Illustrated, Sec. P, Q, Woche C 34, Oct. 1, 1980, Derwent Public. Ltd. London, Q 64.
Soviet Inventions Illus., Sec. 9, P, Q, Woche D 11, Apr. 22, 1981, Derwent Public. Ltd., London; Q 64.

Primary Examiner—Allan D. Herrmann
Assistant Examiner—Stephen B. Andrews
Attorney, Agent, or Firm—Stanley N. Protigal; Howard G. Massung

[57] ABSTRACT

A hermetically sealed drive unit is provided in which a rotationally fixed face gear (27) is mounted within a spherical bore (29) on a bellows (47) so as to cause teeth (31) on the fixed face gear to (27) successfully engage teeth (24) on a rotatable face gear (23). The face gears (23, 27) have different numbers of teeth (24, 31) and therefore must rotate with respect to one another when the teeth (24, 31) engage each other successfully. The rotatable face gear (23) is mounted on one shaft (17), and another shaft (21) is provided with a cam (39). The shaft (21) with the cam rotates in order to cause the rotationally fixed face gear (27) to wobble within the spherical bore (29), causing the teeth (31) on the rotationally fixed face gear to engage the teeth (24) on the rotatable gear (23) in succession.

6 Claims, 1 Drawing Figure

HERMETICALLY SEALED DRIVE

BACKGROUND OF THE INVENTION

This invention relates to a drive unit for transferring rotary force and motion from outside of a hermetically sealed unit to within the sealed unit without the use of lip seals or other shaft seals. Such hermetically sealed drives are used primarily for adjusting sealed instruments on aircraft as well as in space and other applications.

A variety of techniques have been developed in the prior art in order to transfer force and motion across sealed barriers. One technique alluded to above is the use of a lip seal against a rotating shaft. Sealing is effected by the tightness of a seal as it rubs against a polished shaft, as well as by lubricant oil. Typically, these seals are used in automotive air conditioner drives, and are ideal for environments in which lubricant oil may be used for sealing purposes and in which the sealed body is pressurized with respect to the atmosphere or external environment. While such a seal can transfer a large amount of force, usually limited only by the strength of the journalled shaft itself, a certain amount of fluid loss must be tolerated, as, for example, in the above example of automotive air conditioners, where fluid must be added every five to ten years along with an oil charge. Thus, the lip shaft is not a true hermetic seal.

In many cases, it is possible to provide for a transfer of movement by electrical or magnetic means. A typical system would include a matched pair of rotary magnets located on opposite sides of a sealed barrier so that the movement of one magnet effects a corresponding change in the position of the other magnet. Similarly, electrical circuits can be used to translate motion across a hermetically sealed barrier. In either case, such a drive tends to increase the weight of the equipment and tends to allow slippage. Moreover, such a drive is not positive in that slippage may occur. Especially when fine adjustments are made, an electrical or magnetic drive would tend to be difficult to accurately hold in position. Thus, in many cases, a breaking mechanism is required, thereby increasing the complexity and weight of the device.

One technique used to mechanically transfer force across a barrier includes a stick having a ball at one end. The stick is pivoted at a center section so as to cause the ball to move in a circular path. By pressing the ball against a wobble plate, the pivoting stick is able to transfer rotary force across a barrier, usually located near the pivot point. Torque in this arrangement is limited to the size of the shaft. Additionally, the ball has to be constructed so as not to excessively wear when the stick is being pivoted.

In another device, a thin walled gear is deformed by a shell so as to cause it to take a more-or-less elliptical profile. By moving the shell, the ellipital profile rotates with respect to the teeth on the gear, thereby allowing a rotation of the shell to drive another gear in a reverse direction. This system requires a large amount of force to deform the thin walled gear, as well as requiring a large amount of movement in order to effect a small change in adjustment within the hermetically sealed container.

It is the object of the invention to provide a more direct means for transferring rotary force and motion across a hermetically sealed barrier. It is a further object to provide a means for transferring force and rotary motion across a sealed barrier, the means being light in weight and not permitting significant amounts of slippage over the lifetime of the device. It is a further object of the invention to provide a means for positively transferring rotary motion across a hermetically sealed barrier, even though large amounts of force may be required to effect such motion.

SUMMARY OF THE INVENTION

This invention contemplates a hermetically sealed drive unit in which an output shaft within a sealed enclosure is driven by an eccentric face gear nutating in a circular fashion against another face gear fixed to an end of an output shaft. The eccentric face gear rocks against a spherical section in the housing and is rotated against the other face gear by being displaced by a rotating cam. The eccentric face gear seals against the housing by the use of bellows, and the rotating cam is outside of the sealed portion of the enclosure.

BRIEF DESCRIPION OF THE DRAWING

The single drawing FIGURE shows a side view, partially in cross-section, of the drive means according to a preferred embodiment of the invention.

DETAILED DESCRIPTION OF THE PREFERRED EMBODIMENTS

Figure 1:
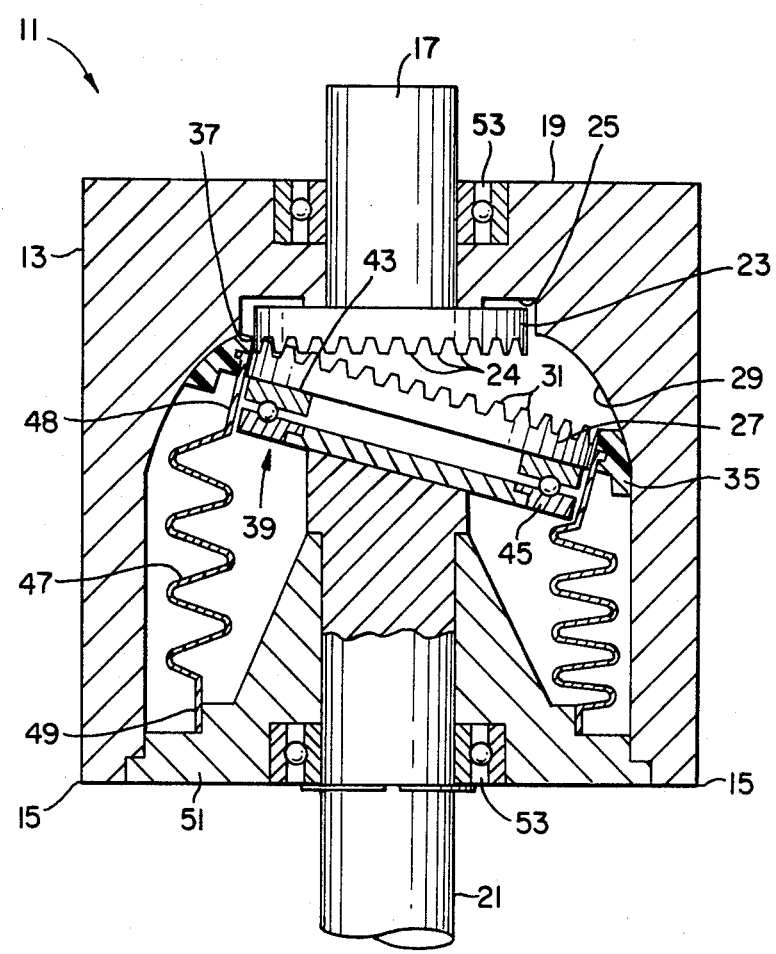

Referring to the drawing FIGURE, a hermetically sealed drive unit 11 comprises a housing body 13, which is normally fixed to a sealed instrument (not shown) or other hermetically sealed device to become a part of the sealed enclosure. Typically, the housing body 13 is attached by welding about its lower outside edges such as edges 15. A first shaft 17, which is preferably an output shaft, is journalled into and extends from the housing body 13 for connection within the instrument. The output shaft 17 is, therefore, within a hermetically sealed volume of the instrument. The first shaft 17 extends from the housing body 13 on a first side 19 of the housing body 13 and a second shaft 21 extends from a direction opposite that of the first side 19. The second shaft 21 is preferably the input shaft and is coaxial with the first shaft 17, although the shafts are separated and are preferrably not concentrically arranged.

At the end of the output shaft 17 closest to the input shaft 21 is a first face gear 23 which, in the preferred embodiment, is a driven gear. The first face gear 23 is coaxial with the shafts 17 and 21 and is fixed to the output shaft 17 so as to cause the output shaft 17 to rotate at the rate of rotation of the first face gear 23. The first face gear 23 has gear teeth 24 on that side of the first face gear 23 facing the input shaft 21. The housing body 13 must have a bored out region 25 to accommodate the first face gear 23.

A second face gear 27 is maintained in the housing body 13 within a spherically shaped bore section 29 located adjacent to bored out region 25. The second face gear 27 is larger than the first face gear 23 and has a larger number of teeth 31 than the corresponding teeth 24 on the first face gear 23. The teeth 24, 31 on the face gears 23, 27 have the same pitch and otherwise correspond to one another so that the teeth 31, 32 may engage one another in a manner known in the art of machine tools. Because of the difference in the number of teeth on the first face gear 23 and the second face gear 27, the teeth 24, 31 may only mesh at one point.

The teeth 31 on the second face gear 27 are allowed to engage the teeth 24 on the first face gear 23 successively by causing the second face gear 27 to oscillate within the spherically shaped bore section 29. A spherical thrust washer 35 is attached to the outer perimeter 37 of the second face gear 27, so that the spherical thrust washer 35 may ride against the spherically shaped bore section 39. The spherical thrust washer 35 is preferrably made of polytetraflorethylene, marketed as Teflon ® (du Pont), in order to provide long wear and reduced friction. Because of the difference in the number of teeth 24, 31 on the face gears 23, 27, the face gears must rotate with respect to one another at a rate proportional to the percentage difference in the number of teeth. Thus, if one of the gears 23 or 27 is held stationary, the other gear would have to rotate as successive teeth 31 on the second face gear engage successive teeth 24 on the first face gear 23.

In order to cause the second face gear 27 to rotationally nutate within the spherically shaped bore section 20 (and thereby cause the teeth 31 to engage teeth 24 successfully), a rotating cam 39 is fixed to the input shaft 21. The rotating cam 39 engages the second face gear 27 at its back side 41, with the back side 41 serving as the cam follower. The cam 39 exerts its camming force against the back side 41 closely adjacent to the portion of the second face gear 27 where teeth 31 are engaging teeth 24 at any given time. As will be seen infra, the second face gear 27 is rotationally fixed. Therefore, in order to reduce friction between the rotary cam 39 and the back side 41, the rotary cam's cam surface 43 is mounted on a ball bearing assembly 45.

A metal bellows 47 is provided and is fixed, at one end 48, to the second gear 27. The bellows 47 is attached at its other end 49 to a stationary part of the drive unit 11. In the preferred embodiment, the input shaft 21 is journalled into a plug 51 which serves as the mounting point for the bellows 47. The plug 51 is sealingly attached to the housing body 13 during the final assembly of the hermetically sealed drive unit 11.

The ends 48, 49 of the bellows 47 are hermetically sealed against the second face gear 27 and the plug 51. This results in a seal extending from the housing body 13, through a portion of the plug 51, through the bellows 47 and the second face gear 27, thereby sealing the drive unit 11. The bellows 47, in addition to providing a seal between the second face gear 27 and the plug 51, also holds the second face gear 27 in a rotationally fixed position.

It can be seen that the interface of the teeth 24, 31 occurs within the seal of the drive unit 11. On the other hand, the rotating cam 39 and the input shaft 21 are outside of the seal. The input shaft 21 and the output shaft 17 are journalled into the plug 51 and housing body 13 by conventional means, such as the ball bearing assemblies 53 shown.

While the preferred embodiment has been described in terms of an input shaft having a particular rotating cam, it is alternatively possible to reverse the position of the drive unit so that the hermetically sealed portion of the drive unit 11 is inside the bellows 47 and includes the input shaft 21. It is also possible to reverse the direction of drive between the input shaft 21 and the output shaft 17, so that power is applied in the opposite direction. Likewise, other modifications to the preferred embodiment may be made, such as the exact positioning of the bellows, et cetera. Accordingly, the invention should be read only as limited by the claims.

What is claimed is:

1. In a system having an input driven connection and an output drive connection, one of which connections is located outside of a hermetically sealed volume, and the other of which connections is connected to components in the hermetically sealed volume to allow rotary force to be transferred from outside of the hermetically sealed volume to the components in the hermetically sealed volume, apparatus for connecting the input drive connection to the output drive connection, said apparatus characterized by:
    (a) a housing body having a first shaft bore, a first gear bore, an outer bore and a bore connection between the first gear bore and the outer bore;
    (b) the bore connection comprising a bore section formed as a smooth spherical segment which converges in the direction of the first shaft bore and diverges in the direction of the outer bore;
    (c) a first shaft having a first face gear fixed to the end thereof and coaxial therewith;
    (d) a second shaft mounted coaxially with the first shaft and having a first end facing the first gear;
    (e) a spherical thrust washer is provided to comply with the spherical segment;
    (f) a second face gear which rides against the spherical segment, the second face gear having a different number of teeth than the first gear, the second face gear being mounted to the spherical thrust washer so as to prevent the second face gear from substantially engaging the spherical segment when the second face gear is riding against the spherical segment;
    (g) sealing means cooperating with the second face gear to effect a hermetic seal across the housing body the sealing means preventing the second gear from rotating about its axis of symmetry; and
    (h) drive means which causes the second face gear to rotationally nutate against the spherical segment, the drive means including a cam on the first end of the second shaft, the cam's cam follower being the second face gear, the rotation of the second shaft causing the cam to nutate the second face gear, and the second face gear's nutation causing the second face gear's teeth to successively engage the first face gear's teeth, wherein
    the first shaft is the output drive connection and is located within the hermetically sealed volume and the second shaft is the input drive connection and is located outside of the hermetically sealed volume.

2. Apparatus as described by claim 1, characterized by the sealing means including a bellows fixed to the second gear.

3. Apparatus as described by claims 1 or 2 characterized in that the sealing means is the means to prevent the second gear and rotating.

4. Apparatus as described by claim 2, characterized in that:
    (a) the bellows also functions as the means to prevent the second gear from rotating about its axis of symmetry;
    (b) a retaining plug is provided which is fitted into the housing body, the second shaft passes through the retaining plug; and
    (c) the bellows is attached with the housing body by being attached to the retaining plug.

5. Apparatus as described by claim 2, further characterized in that at least one of said shafts are provided with rotating element-and-race bearings.

6. Apparatus as described in claim 2, characterized in that the cam comprises a rotating element-and-race bearing to reduce friction as the cam is rotated with the second shaft.

* * * * *